(12) United States Patent
Jahromi et al.

(10) Patent No.: US 7,574,601 B2
(45) Date of Patent: Aug. 11, 2009

(54) SECURELY INSPECTING ELECTRONIC MESSAGES

(75) Inventors: Babak G. Jahromi, Bellevue, WA (US); John F. Noss, Issaquah, WA (US); Dhananjay M. Mahajan, Sammamish, WA (US); Scott Christopher Seely, Bellevue, WA (US); Daniel W. Roth, Bellevue, WA (US); Travis John Muhlestein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 10/925,024

(22) Filed: Aug. 24, 2004

(65) Prior Publication Data

US 2006/0048220 A1 Mar. 2, 2006

(51) Int. Cl.
*H04L 9/32* (2006.01)
(52) U.S. Cl. ....................... 713/168; 713/170
(58) Field of Classification Search ............. 726/22
See application file for complete search history.

(56) References Cited

U.S. PATENT DOCUMENTS

2004/0122906 A1* 6/2004 Goodman et al. ........... 709/206
2004/0125403 A1* 7/2004 Furst et al. .................. 358/1.15
2004/0128353 A1* 7/2004 Goodman et al. ........... 709/204

* cited by examiner

*Primary Examiner*—Nasser G Moazzami
*Assistant Examiner*—Carlton V Johnson
(74) *Attorney, Agent, or Firm*—Workman Nydegger (57) ABSTRACT

The present invention extends to methods, systems, and computer program products for securely inspecting electronic messages. A computer system receives a control message that is passed through one or more receiving path components, positioned in a message receiving path, to a security component. The security component authenticates the received control message and passes the received control message to an inspection control component. The inspection control component activates message inspection in accordance with instructions contained in the received control message. When message inspection is activated, the computer system passes accessed messages to corresponding inspection components positioned in message paths (either receiving or sending) of the accessed message. The inspection component generates an inspection report (e.g., including a portion of contents of the accessed message) in accordance with instructions contained in a previously authenticated control message.

33 Claims, 4 Drawing Sheets

SECURELY INSPECTING ELECTRONIC MESSAGES

CROSS-REFERENCE TO RELATED APPLICATIONS

Not applicable.

BACKGROUND OF THE INVENTION

1. The Field of the Invention

The present invention relates to electronic messaging technology; and more specifically, to mechanisms for securely inspecting electronic messages.

2. Background and Related Art

Computer systems and related technology affect many aspects of society. Indeed, the computer system's ability to process information has transformed the way we live and work. Computer systems now commonly perform a host of tasks (e.g. information management, scheduling, and word processing) that prior to the advent of the computer system were typically performed manually. More recently, computer systems have been coupled to one another to form computer networks over which computer systems may transfer data electronically.

Initially, a significant portion of data transfer on computer networks was performed using specific applications (e.g., electronic mail applications) to transfer data files from one computer system to another computer. For example, a first user at a first networked computer system could electronically mail a word processing document to a second user at a second networked computer system. However, program execution (e.g., running the electronic mail application) and data access (e.g., attaching the word processing document to an electronic mail message) were essentially completely performed at single computer system (e.g., the first computer system). That is, a computer system would execute programs and access data from storage locations contained within the computer system. Thus, being coupled to a network would not inherently give one networked computer system the ability to access data from another networked computer system. Only after a user actively sends data to a computer system could the computer system access the data.

However more recently, as the availability of higher-speed networks has increased, many computer networks have shifted towards a distributed architecture. Such networks are frequently referred to as distributed systems. Distributed systems function to "distribute" program execution and data access across the modules of a number of different computer systems coupled to a network.

In a distributed system, modules connected to a common network interoperate and communicate between one another (e.g., exchanging electronic messages) in a manner that may be transparent to a user. For example, a user of a client computer system may select an application program icon from a user-interface thereby causing an application program stored at a server computer system to execute. The user-interface may indicate to the user that the application program has executed, but the user may be unaware, and in fact may not care, that the application program was executed at the server computer system. The client computer system and the server computer system may exchange electronic messages in the background to transfer the user's commands, program responses, and data between the client computer system and the server computer system.

Often, a distributed system includes a substantial number of client computer systems and server computer systems. In many cases, computer systems of a distributed system may function both as client computer systems and server computer systems, providing data and resources to some computer systems and receiving data and resources form other computer systems. Each computer system of a distributed system may include a different configuration of hardware and software modules. For example, computer systems may have different types and quantities of processors, different operating systems, different application programs, and different peripherals. Additionally, the communications path between computer systems of a distributed system may include a number of networking components, such as, for example, firewalls, routers, proxies and gateways, and communication paths can change from time to time.

In some environments, "distributed applications", such as, for example, Web services applications, are specifically designed for execution in a distributed system (e.g., the Internet). Distributed applications can include hundreds or thousands of modules and each module can be compiled from thousands or even millions of lines of source code. Further, each module of a distributed application must be design to appropriately communicate with other modules of the distributed application, as well as other modules in associated distributed systems. For example, interoperation of different modules of a distributed application can require exchanging electronic messages (e.g., Simple Object Access Protocol ("SOAP") envelopes) according to specified security and policy requirements. Thus, the design and configuration of distributed applications is significantly more complex than for stand-alone applications.

Due at least in part to this complexity, communication between portions of distributed applications (even those that are properly configured) may operate in an undesirable manner from time to time. As such, it is often desirable to perform diagnostic operations (e.g., testing, debugging, profiling, and tracing) on electronic messages exchanged between modules of a distributed application.

For example, some diagnostic techniques used on distributed applications is to attach, or "glue on," a separate third-party diagnostic process to distributed application modules. As electronic messages are exchanged with the module, the third-party diagnostic process records diagnostic data to a log file. In some cases, third-party diagnostic processes are attached to a number of different distributed application modules and each third-party diagnostic process records data to a separate log file. The separate log files are then combined and correlated to give some indication of what may be causing undesirable communication between portions of a distributed application.

Unfortunately, attaching separate third-party diagnostic processes to distributed application modules can be time consuming and can require that the corresponding distributed application be brought down and redirect the message traffic. Since distributed applications have modules at a plurality of different computer systems, properly bringing down a distributed application may require coordination between the administrators of the different computer systems and redirection of message traffic may involve additional coordination. Bringing down and redirecting a distributed application to attach third-party diagnostic processes can also result in users of the distributed application losing access to. information and revenue.

Further, third-party diagnostic processes are often designed based on a one size fits all approach. That is third-party diagnostic processes may have standardized diagnostic operations with limited ability to configure the diagnostic operations for specific distributed applications. However, the complexity of individual distributed applications makes it difficult, if not impossible, to design third-party diagnostic processes to include all the possible diagnostic operations that could be performed. Thus, while third-party diagnostic processes may be sufficient for performing basic diagnostic operations, third-party diagnostic processes often lack functionality for more complex diagnostic operations (e.g., timing interactions and interdependencies).

Thus, distributed application designers can include specialized diagnostic code within distributed applications to implement more complex diagnostic operations. Specialized code can cause a distributed application to report information from different modules of the distributed application to a centrally located diagnostic module. Thus, diagnostic module is better positioned to determine what is causing undesirable behavior. However, the use of specialized diagnostic code has at least one inherent problem: specialized diagnostic code is often self-contained and will not interact with other diagnostic processes. Due to these incompatibilities, specialized diagnostic code must be individually developed for different distributed applications. This is time consuming and may require substantially technical expertise on the part of a programmer.

Further, typical diagnostic techniques offer little control over the type of diagnostic functions that are performed and the amount and type of data that is gathered. For example, some diagnostic processes (e.g., NetMon) add a message redirector between computer systems that are exchanging electronic messages. To implement diagnostic operations for an electronic message, the message redirector receives an electronic message that originated at a sender, access at least a portion of the contents (e.g., headers and bodies) of the electronic message, performs a diagnostic operation based on the accessed contents, and forwards the electronic message towards the destination.

In some environments, diagnostic operations need to be performed on secure data, such as, for example, data that is encrypted and/or digitally signed. Thus, a message redirector may be provided with security information (e.g., keys) for accessing electronic message contents. For example, to implement a diagnostic operation for a malfunctioning sales application, a message redirector may be provided keys for validating a digital signature and decrypting personal and financial data contained in electronic messages. Thus, at least for the time needed to provide the personal and financial data to a diagnostic module, the personal and financial data is available in an insecure (unencrypted) format. Depending on the implemented diagnostic operation, the message redirector may also log portions of the accessed data making them further available.

Since many distributed systems, such as, for example, the Internet, are shared by a large number of entities, manipulating sensitive data at an intermediate computer system poses a security risk. For example, a malicious user could attempt to compromise a message redirector and access exposed data. Alternately, a malicious user could design a program that impersonates a legitimate message redirector. The malicious user could run the program in an attempt to have distributed application modules transfer sensitive data and corresponding security information to the program.

Accordingly, what would be advantageous are mechanisms for securely and efficiently performing diagnostic operations for electronic messages.

BRIEF SUMMARY OF THE INVENTION

The foregoing problems with the prior state of the art are overcome by the principles of the present invention, which are directed to securely inspecting electronic messages. A plurality of computer systems is connected to one another such that the computer systems can exchange electronic messages. In some embodiments, a computer system securely activates electronic message inspection. The computer system receives a control message. The computer system passes the received control message through one or more receiving path components that are positioned in the receiving path of the received control message. The computer system passes the received control message to a security component subsequent to the received control message being passed through the one or more receiving path components.

The security component authenticates a sender and contents of the received control message. The computer system passes the received control message to an inspection control component in the receiving path subsequent to authenticating the received control message. The inspection control component activates message inspection in accordance with instructions contained in the received control message.

In other embodiments, a computer system securely inspects an electronic message. The computer system accesses a message. The computer system passes the received message to an inspection component positioned in a message path of the accessed message. The inspection component generates an inspection report, in accordance with instructions contained in a previously authenticated control message, for the accessed message. The computer system passes the accessed message through one or more message path components that are positioned in the message path of the accessed message subsequent to generating the inspection report.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to securely inspecting electronic messages. A plurality of computer systems is connected to one another such that the computer systems can exchange electronic messages. In some embodiments, a computer system securely activates electronic message inspection. The computer system receives a control message. The computer system passes the received control message through one or more receiving path components that are positioned in the receiving path of the received control message. The computer system passes the received control message to a security component subsequent to the received control message being passed through the one or more receiving path components, The security component authenticates a sender and contents of the received control message. The computer system passes the received control message to an inspection control component in the receiving path subsequent to authenticating the received control message. The inspection control component activates message inspection in accordance with instructions contained in the received control message.

In other embodiments, a computer system securely inspects an electronic message. The computer system accesses a message. The computer system passes the received message to an inspection component positioned in a message path of the accessed message. The inspection component generates an inspection report, in accordance with instructions contained in a previously authenticated control message, for the accessed message. The computer system passes the accessed message through one or more message path components that are positioned in the message path of the accessed message subsequent to generating the inspection report.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
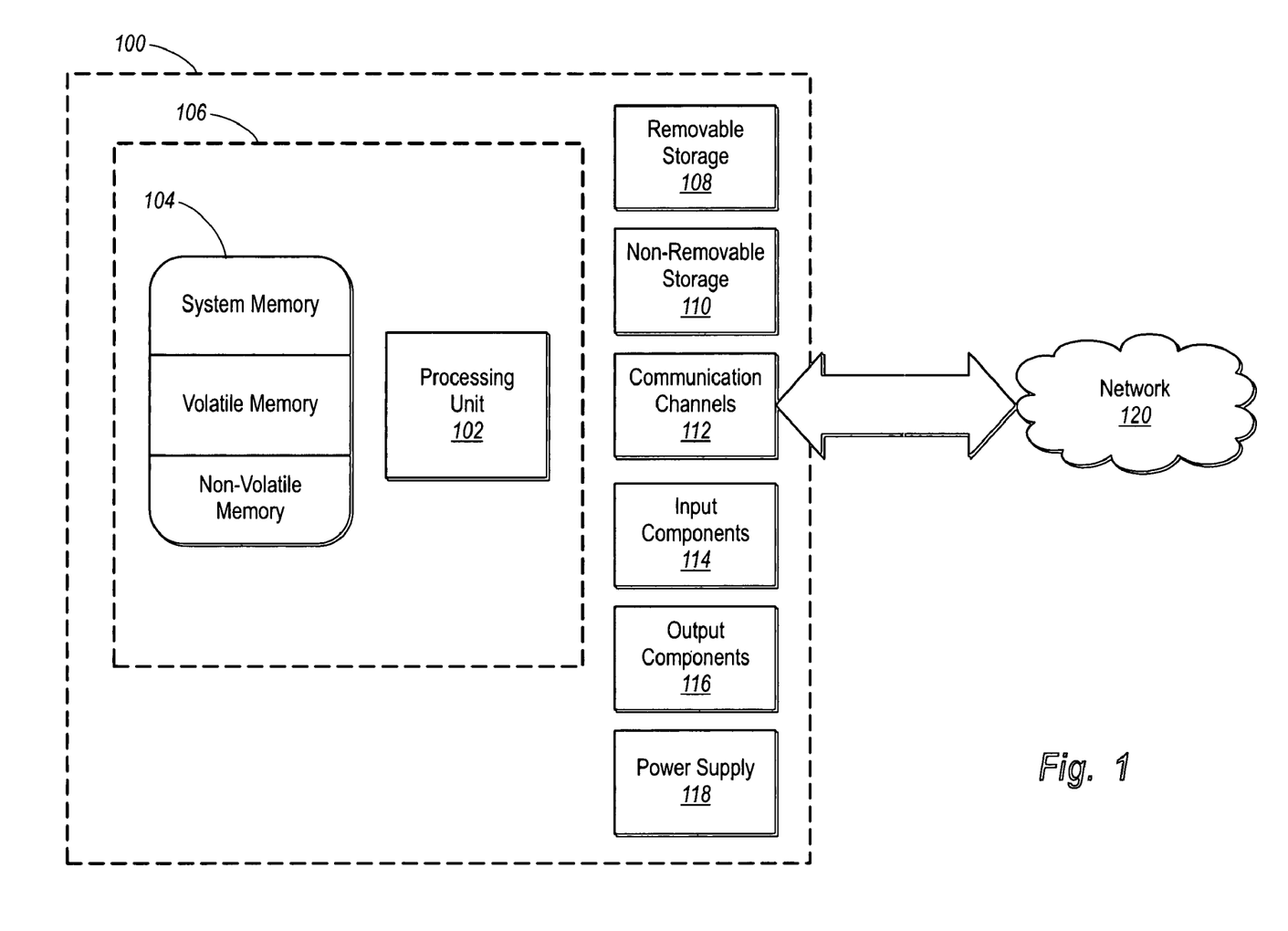
FIG. 1 illustrates a suitable computer system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer system in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computer systems be interpreted as having any dependency or requirement relating to anyone or combination of components illustrated in FIG. 1.

The invention is operational with numerous other general-purpose or special-purpose computing or communications environments or configurations. Examples of well known computer systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In some basic configurations, computer system 100 includes at least one processing unit 102 and memory 104. The memory 104 may be volatile (such as RAM), non-volatile (such as ROM, flash memory, etc.), or some combination of the two. One basic configuration is illustrated in FIG. 1 by the dashed line 106.

Included storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computer system.

As used herein, the term "module" or "component" can refer to software objects or routines that execute on the computer system. The different components, modules, engines, and services described herein may be implemented as objects or processes that execute on the computer system (e.g., as separate threads). While the system and methods described herein are preferably implemented in software, implementations in software and hardware or hardware are also possible and contemplated.

Computer system 100 may also contain communication channels 112 that allow the host to communicate with other systems and devices over a network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computer system 100 may also have input components 114 such as a keyboard, mouse, pen, a voice-input component, a touch-input device, and so forth. Output components 116 include screen displays, speakers, printer, etc., and rendering modules (often called "adapters") for driving them. The computer system 100 has a power supply 118. All these components are well known in the art and need not be discussed at length here.

Figure 2:
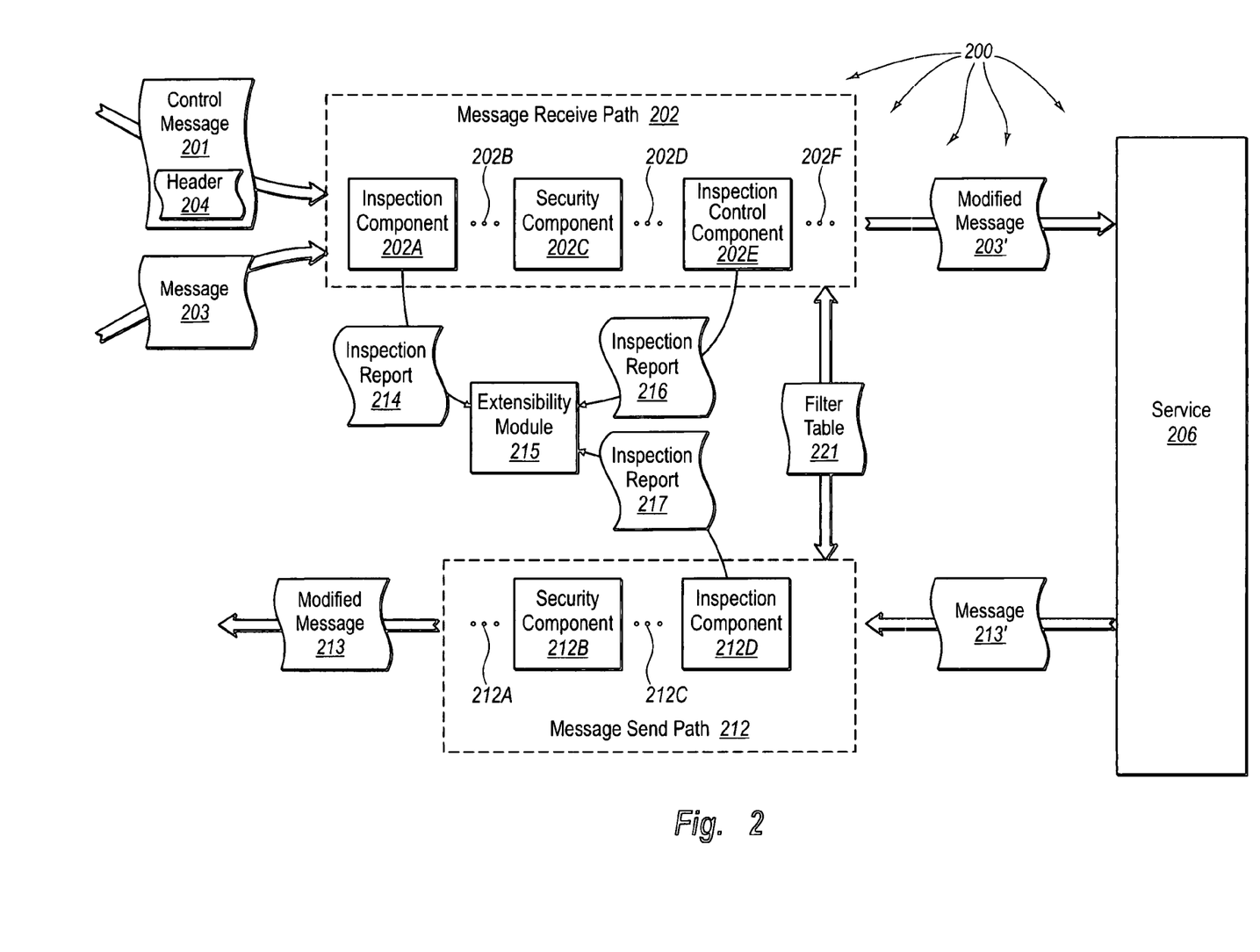
FIG. 2 illustrates a computer architecture including components that may cooperatively interact to securely activate electronic message inspection and to securely inspect on an electronic message.

FIG. 2 illustrates a computer architecture 200 including components that may cooperatively interact to securely activate electronic message inspection and to securely inspect an electronic message. When implemented in the context of the computer system 100 of FIG. 1, the various components may be instantiated in memory 104 and/or be persisted in persistent memory such as, for example, removable storage 108 and/or non-removable storage 110. The persistent memory may be, for example, a magnetic or optical disk.

Generally, message receive path 202 receives and processes electronic messages, such as, for example, Simple Object Access Protocol ("SOAP") envelopes, containing data that is to be delivered to service 206 (e.g., a Web service). Message send path 212 receives and processes data from service 206, such as, for example, application data to be included in a SOAP envelope, for delivery to other computer systems. Each of the message paths 202 and 212 can include one or more message path components that perform operations on electronic messages and message related data.

Generally, message path components can be configured to modify electronic messages with at least one modification. For example, message path components can add, delete, or change SOAP headers and bodies (e.g., adding, deleting, or changing Extensible Markup Language ("XML") instructions). Thus after receiving message 203 (e.g., a SOAP envelope), message receive path 202 can modify message 203 resulting in modified message 203' (e.g., corresponding application data). Similarly, after receiving message 213' (e.g., application data), message send path 212 can modify message 213' resulting in modified message 213 (e.g., a corresponding SOAP envelope).

Inspection component 202A, security component 202C, and inspection control component 202E are expressly depicted within message receive path 202. When activated, inspection component 202A can access the contents of electronic messages (e.g., SOAP headers and bodies) and forward the accessed contents to an extensibility point (e.g., extensibility module 215). The extensibility point can store the accessed contents (either locally or remotely), can send the accessed contents across a network to another computer system (e.g., by including the accessed contents in another message, for example, a SOAP envelope), or can perform other operations on the accessed contents. Security component 202C performs security operations, such as, for example, validating digital signatures and decrypting message contents, on electronic messages. Inspection control component 202E controls other inspection components and can also access the contents of electronic messages and forward the accessed contents to an extensibility point (e.g., extensibility module 215).

Horizontal ellipses 202B, 202D, and 202F represent that other message receive path components, in addition to inspection component 202A, security component 202C, and inspection control component 202E, can be included in message receive path 202. For example, other message receive path components can include a performance counters component, a role set component, a policy component, a rule administration component, a route component, a did understand component, and a receive comply component. Inspection component 202A, security component 202C, and inspection control component 202E can be appropriately positioned between other message receive path components to implement the principles of the present invention.

Inspection component 212D and security component 212B are expressly depicted within message send path 212. When activated, inspection component 212D can access the contents of electronic messages (e.g., SOAP headers and SOAP bodies) and send the accessed contents to an extensibility point (e.g., extensibility module 215). Security component 212B performs security operations, such as, for example, digitally signing and encrypting electronic messages.

Horizontal ellipses 212A and 212C represent that other message send path components, in addition to inspection component 212D and security component 212B, can be included in message send path 212. For example, other message send path components can include a transmit component and a policy component. Inspection component 212D and security component 212B can be appropriately positioned between other message send path components to implement the principles of the present invention.

Inspection control component 202E can load and unload message filters included in filter table 221 to turn message inspecting on and off and control message inspection. Inspection control component 202E can also communicate with other inspection components (e.g., inspection components 202A and 212D) to turn message inspecting on and off and control other inspection component's message inspection. For example, inspection control component 202E can cause inspection components 202A and 212D to load and unload filters included in filter table 221. Filters can be loaded to and unload from memory, such as, for example, system memory 104.

Filter table 221 includes one or more message filters that can be used to indicate when message inspection is to be performed. Generally, when an inspection component (or inspection control component) accesses an electronic message, the inspection component (or inspection control component) determines if corresponding message content matches a loaded message filter. When message content matches a loaded message filter, the inspection component (or inspection control component) can perform an inspection operation, such as, for example, accessing, forwarding, and storing message content or other message related data. On the other hand when message content does not match a loaded message filter, the inspection component (or inspection control component) does not perform a message inspection. Filters in filter table 221 can include filter criteria indicating message content that is to be matched and can include filter actions indicating what to do when a match is detected. Filter criteria and filter actions can be represented using an XML Path Language ("XPath") statement although this is not required.

Figure 3:
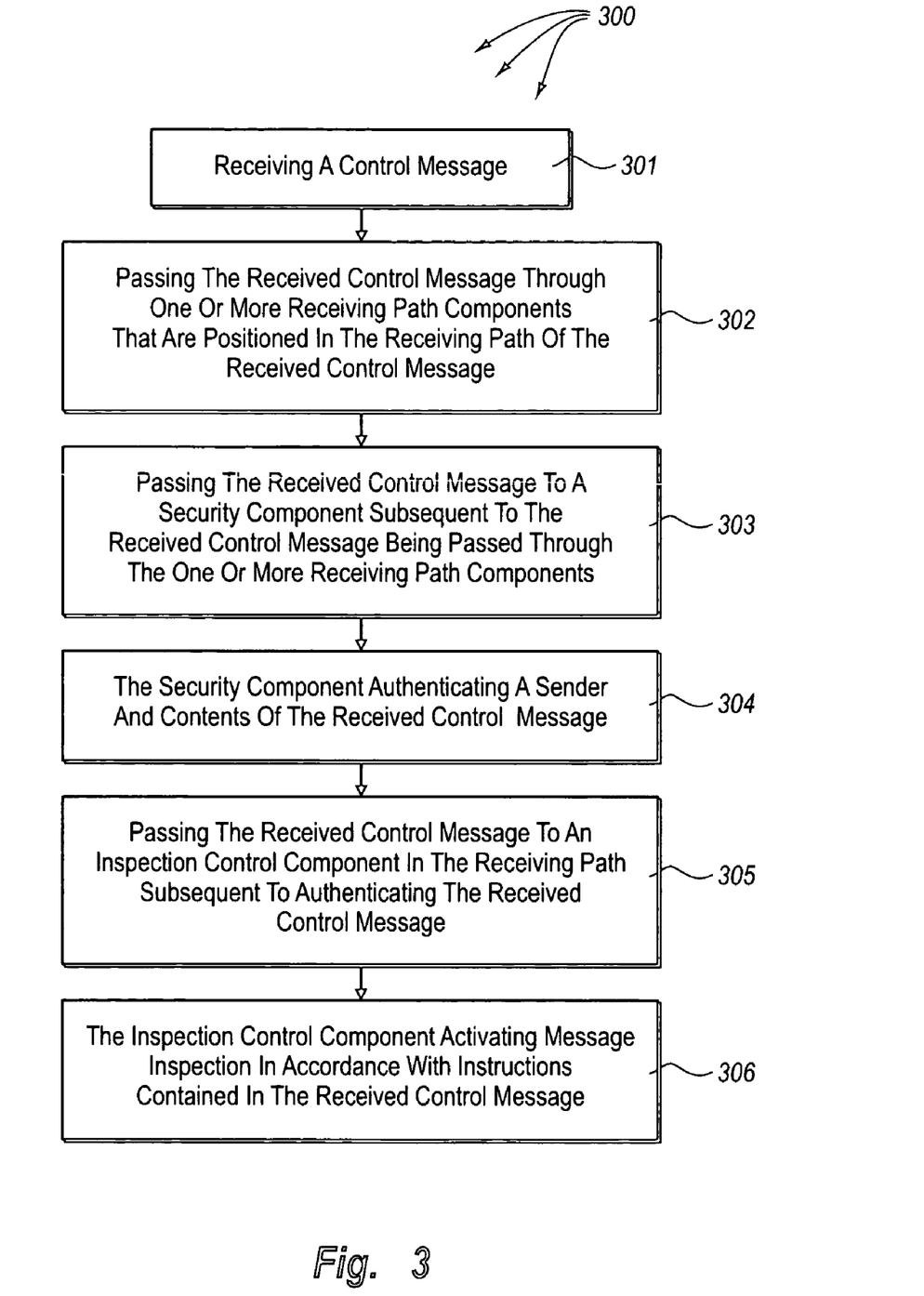
FIG. 3 illustrates a flowchart of method for securely activating electronic message inspection.

FIG. 3 illustrates a flowchart of method 300 for securely activating electronic message inspection. Method 300 will be described with respect to the components and data in computer architecture 200.

Method 300 includes an act of receiving a control message (act 301). For example, message receive path 202 can receive control message 201. Control message 201 includes header 204 that indicates a message inspection configuration (e.g., filters that are to be loaded and loaded). However, an inspection configuration can also be included in a message body. Header 204 can include an indication that the inspection configuration is to be delivered to inspection control component 202E.

Method 300 includes an act of passing the received control message through one or more receiving path components that are positioned in the receiving path of the received control message (act 302). For example, control message 201 can be passed through inspection component 202A and other components represented by horizontal ellipsis 202B. Method 300 includes an act of passing the received control message to a security component subsequent to the received control message being passed through the one or more receiving path components (act 303). For example, control message 201 can be pass to security component 202C subsequent to being passed through inspection component 202A and other components represented by horizontal ellipsis 202B.

Method 300 includes an act of the security component authenticating a sender and contents of the received control message (act 304). For example, security component 202C can authenticate the sender and contents (e.g., header 204) of control message 201. Method 300 includes an act of passing the received control message to an inspection control component in the receiving path subsequent to authenticating the received control message (act 305). For example, control message 201 can be passed to inspection control component 202E subsequent to security component 202C authenticating control message 202E.

Method 300 includes an act of the inspection control component activating message inspection in accordance with instructions contained in the received control message (act 306). For example, based on inspection configuration in header 204, inspection control component 202E can send instructions to load and/or unload message filters at inspection component 202A and/or inspection control component 202E and/or inspection component 212D. In response to the instructions, inspection component 202A, inspection control component 202E, and inspection component 212D can load and/or unload filters from filter table 221. Alternately, inspection control component 202E can send instructions to initiate message inspection or terminate message inspection. In response, an inspection component can become active (e.g., transition to a state that can load and unload filters) or inactive (e.g., transition to a sleep state or turn itself off) respectively.

Since control message 201 was authenticated prior to being passed to inspection control component 202E, there is a reduced likelihood that the sender and contents of control message 201 have be altered. Thus, if the sender of control message 201 is authorized to activate and configure message inspection, there is increased confidence that message inspection is to be activated in accordance with instructions from an authorized entity (e.g., an administrator). Further, since message inspection activation is integrated into message paths (and not implemented at an intermediate computer system), there is a reduce likelihood of exposing secure data. Accordingly, message inspection can be securely activated.

Figure 4:
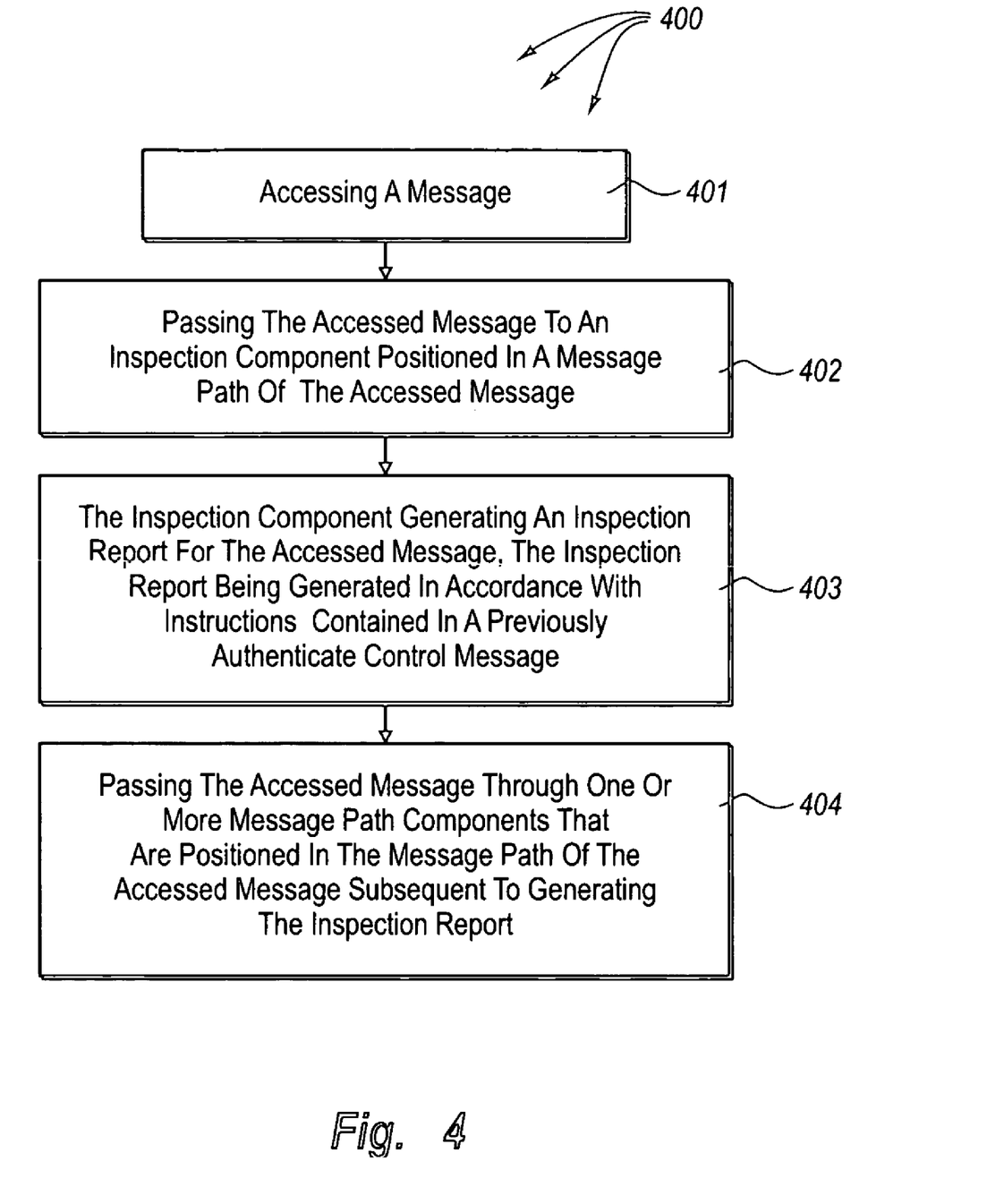
FIG. 4 illustrates a flowchart of a method for securely inspecting an electronic message.

FIG. 4 illustrates a flowchart of a method 400 for securely inspecting an electronic message. Method 400 will be described with respect to the components and data in computer architecture 200.

Method 400 includes an act of accessing a message (act 401). For example, message receiving path 202 can access message 203. Alternately, message send path 212 can access message 213'. Method 400 includes an act of passing the accessed message to an inspection component positioned in a message path of the accessed message (act 402). For example, message receive path 202 can pass message 203 to inspection component 202A and/or inspection control component 202E. Alternately, message send path 212 can pass message 213' to inspection component 212D.

Method 400 includes an act of the inspection component generating an inspection report for the accessed message (act 403). For example, inspection component 202A, inspection control component 202E, and inspection component 212D can generate corresponding inspection reports 214, 216 and 217 respectively. An inspection report can be generated in accordance with instructions contained in a previously authenticated control message. For example, in response to control message 201, one or more message filters from filter table 221 may be loaded at inspection component 202A, inspection control component 202E, and inspection component 212D. Inspection component 202A, inspection control component 202E, and inspection component 212D can attempt to match the contents of message 203 to filter criteria of the loaded filters. When a match is detected, an inspection report containing a portion of the contents of message 203 can be generated.

Generated inspection reports (e.g., inspection reports 214, 216 and 217) can be sent to extensibility module 215. Extensibility module 215 can be included in the same computer system that includes message receive path 202 and/or message send path 212 or can be included in some other computer system. Thus, in some embodiments, inspection reports are generated and stored locally and thus generation and storage of the inspection reports do not involve communication with an intermediate computer system. Further, since message inspection is implemented in accordance with a previously authenticated control message, there is increased confidence that message inspection is to be performed in accordance with instructions from an authorized entity. Additionally, since message inspection is integrated into message paths (and not implemented at an intermediate computer system), there is a reduce likelihood of exposing secure data. Accordingly, message inspection can be performed with increased security.

Method 400 includes an act of passing the accessed message through one or more message path components that are positioned in the message path of the accessed message subsequent to generating the inspection report (act 404). For example, message 203 can be passed through other message receive path components, in addition to inspection component 202A, and inspection control component 202E. Alternately, message 213' can be passed through other message send path components, in addition to inspection component 212D.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system connected to a network, the computer system including a component of a distributed application, the component of the distributed application at the computer system interoperating with components of the distributed application at other computer systems connected to the network through the exchange of distributed application messages to implement the functionality of the distributed application, a method for securely activating secure distributed application message inspection at the computer system, the method comprising the following:

an act of the computer system receiving a message inspection control message from another computer system connected to the network, the message inspection control message including message inspection instructions from an administrator, the message inspection instructions indicating how to configure distributed application message inspection at the computer system for any messages sent to the distributed application component, distributed application message inspection for inspecting the contents of subsequently received distributed application messages sent to the distributed application component;

an act of passing the received message inspection control message through one or more receiving path components positioned in a message receive path at the computer system situated prior to the distributed application component at the computer system, each of the receiving path components configured to modify electronic messages with at least one modification, the one or more receiving path components including an inspection component;

an act of passing the received message inspection control message to a security component in the message receive path subsequent to the received message inspection control message being passed through the one or more other receiving path components;

an act of the security component at the computer system authenticating the administrator and authenticating the contents of the received message inspection control message to determine that distributed application message inspection in accordance with the inspection instructions contained in the message inspection control message is permissible at the computer system, authentication of the administrator indicating an increased confidence that message inspection is to be activated in accordance with instructions from an authorized entity, authentication of the contents of the message inspection control message indicating a decreased likelihood that the inspection instructions contained in the message inspection control message have been altered;

an act of passing the received message inspection control message to an inspection control component included in the message receive path subsequently and in response to the security component at the computer system authenticating the administrator and authenticating the contents of the received message inspection control message and based on the increased confidence that message inspection is to be activated in accordance with instructions from an authorized entity and based on the decreased likelihood that the inspection instructions have been altered; and an act of the inspection control component controlling the message inspection component to activate distributed application message inspection for distributed application messages sent to the distributed application component at the computer system in accordance with the inspection instructions contained in the message inspection control message received from the other computer system connected to the network so as to integrate message inspection activation for the distributed application component into the receive message path for the distributed application component.

2. The method as recited in claim 1, wherein the act of receiving a message inspection control message comprises an act receiving a Simple Object Access Protocol (SOAP) envelope.

3. The method as recited in claim 2, wherein the act of receiving a Simple Object Access Protocol (SOAP) envelope comprises an act of receiving a Simple Object Access Protocol (SOAP) envelope having a header that contains an inspection configuration.

4. The method as recited in claim 1, wherein the act of passing the received message inspection control message through one or more receiving path components comprises an act of passing the received control message through one or more of a performance counter component and a role set component.

5. The method as recited in claim 1, wherein the act of passing the received message inspection control message to a security component comprises an act of passing the received message inspection control message to a security component that is positioned before the inspection control component in the receiving path.

6. The method as recited in claim 1, wherein the act of the security component authenticating the administrator and contents of the received message inspection control message comprises an act of validating a digital signature.

7. The method as recited in claim 6, further comprising:
an act of decrypting the message inspection control message.

8. The method as recited in claim 1, wherein the act of passing the received message inspection control message to an inspection control component comprises an act of passing the received message inspection control message to an inspection control component that is positioned after the security component in the receive path.

9. The method as recited in claim 1, wherein the act of the inspection control component activating message inspection in accordance with instructions contained in the received message inspection control message comprises an act of activating message inspection in accordance with instructions contained in a Simple Object Access Protocol (SOAP) header.

10. The method as recited in claim 1, wherein the act of the inspection control component controlling the message inspection component to activate message inspection in accordance with instructions contained in the received message inspection control message comprises an act of sending instructions to one on or more inspection components to load a message filter.

11. The method as recited in claim 10, wherein the message filter is loaded from a filter table.

12. The method as recited in claim 10, wherein the message filter includes XPath statements.

13. The method as recited in claim 1, further comprising the inspection control component loading a message filter to activate message inspection in accordance with instructions contained in the received message inspection control message.

14. In a computer system connected to a network, the computer system including a component of a distributed application, the component of the distributed application at the computer system interoperating with components of the distributed application at other computer systems connected to the network through the exchange of distributed application messages to implement the functionality of the distributed application, a method for securely inspecting a distributed application message, the method comprising the following:
an act of the computer system receiving a distributed application message from a first one of the other computer systems connected to the network, the distributed application message for delivery to the distributed application component at the computer system;

an act of passing the received distributed application message to a message receive path at the computer system, the message receive path having one or more message path components including a message inspection component positioned prior to a security component in the message receive path and an inspection control component positioned after the security component in the message receive path, the message inspection component having previously been controlled by the inspection control component to integrate message inspection activation for any message sent to the distributed application component into the receive message path by loading one or more filters from a filter table in response to inspection instructions contained in a previously received message inspection control message, the message inspection control message received from a second one of the other computer systems connected to the network, the sender and contents of the previously received message inspection control message having been authenticated by the security component, authentication of the sender indicating an increased confidence that the message inspection is to be activated in accordance with instructions from an authorized entity, authentication of the contents of the message inspection control message indicating a decreased likelihood that the inspection instructions contained in the message inspection control message have been altered;

an act of the inspection component detecting that the content of the received distributed application message from the first other computer system matches the filter criteria of at least one of the one or more loaded filters;

an act of the inspection component performing a corresponding inspection operation on the received distributed application message from the first other computer system in response to the detected match, the corresponding filter action performed in accordance with inspection instructions contained in the previously received and authenticated message inspection control message received from the second other computer system, the filter operation including extracting a portion of the received distributed application message for inclusion in an inspection report; and an act of passing the accessed message through one or more message path components that are positioned in the message receive path subsequent to performing the corresponding filter action and prior to delivering the distributed application message to the distributed application component at the computer system.

15. The method as recited in claim 14, wherein the act of receiving a message comprises an act of accessing a Simple Object Access Protocol (SOAP) envelope.

16. The method as recited in claim 14, further comprising:
an act of generating the inspection report for the received message, the inspection report including data from the received message related to the performed filter operation.

17. The method as recited in claim 16, wherein the act of detecting that the content of the received message matches the contents of the received message comprises an act of matching the contents of the received message to a portion of an XPath statement.

18. The method as recited in claim 14, wherein the act of performing a corresponding filter action on the received message comprises an act of including a portion of the contents of the received message in an inspection report.

19. The method as recited in claim 18, further comprising:
an act of storing the inspection report.

20. The method as recited in claim 18, further comprising:
an act of sending the inspection report to an extensibility module.

21. The method as recited in claim 14, wherein the act of passing the received message through one or more message path components comprises an act of passing the received message through one or more receive path components.

22. The method as recited in claim 21, further comprising:
an act of delivering a modified message to a Web service.

23. The method as recited in claim 14, wherein the act of passing the received message through one or more message path components comprises an act of passing the received message through one or more send path components at the computer system.

24. The method as recited in claim 23, further comprising:
an act of delivering a modified message to another computer system.

25. A computer program product for use at a computer connected to a network, the computer system including a component of a distributed application, the component of the distributed application at the computer system interoperating with components of the distributed application at other computer systems connected to the network through the exchange of distributed application messages to implement the functionality of the distributed application, the computer program product for implementing a method for securely activating secure distributed application message inspection, the computer program product comprising one or more computer storage media having stored thereon computer-executable instructions that, when executed by a processor, cause the computer system to perform the following:

receive a message inspection control message from another computer system connected to the network, the message inspection control message including message inspection instructions from an administrator, the message inspection instructions indicating how to configure distributed application message inspection at the computer system for any messages sent to the distributed application component, distributed application message inspection for inspecting the contents of subsequently received distributed application messages sent to the distributed application component;

pass the received message inspection control message through one or more receiving path components that are positioned in a message receive path at the computer system situated prior to the distributed application component at the computer system, each of the receiving path components configured to modify electronic messages with at least one modification, the one or more receiving path components including an inspection component;

pass the received message inspection control message to a security component in the message receive path subsequent to the received message inspection control message being passed through the one or more other receiving path components;

authenticate the administrator and the contents of the received message inspection control message at the security component to determine that distributed application message inspection in accordance with the inspection instructions contained in the message inspection control message is permissible at the computer system, authentication of the administrator indicating an increased confidence that message inspection is to be activated in accordance with instructions from an authorized entity, authentication of the contents of the message inspection control message indicating a decreased likelihood that the inspection instructions contained in the message inspection control message have been altered;

pass the received message inspection control message to an inspection control component included in the message receive path subsequently and in response to the security component at the computer system authenticating the administrator and authenticating the contents of the received message inspection control message and based on the increased confidence that message inspection is to be activated in accordance with instructions from an authorized entity and based on the decreased likelihood that the inspection instructions have been altered; and control the message inspection component to activate distributed application message inspection for distributed application messages sent to the distributed application component at the computer system in accordance with the inspection instructions contained in the message inspection control message received from the other computer system connected to the network so as to integrate message inspection activation for the distributed application component into the receive message path for the distributed application component.

26. The method as recited in claim 25, wherein computer-executable instructions that when executed cause the computer system to receive a message inspection control message comprise computer-executable instructions that when executed cause the computer system to receive a Simple Object Access Protocol (SOAP) envelope.

27. The method as recited in claim 25, wherein computer-executable instructions that when executed cause the computer system to pass the received message inspection control message to a security component comprise computer-executable instructions that when executed cause the computer system to pass the received message inspection control message to a security component positioned before the inspection control component in the message receive path.

28. The method as recited in claim 25, wherein computer-executable instructions that when executed cause the computer system to pass the received message inspection control message to an inspection control component comprise computer-executable instructions that when executed cause the computer system pass the received message inspection control message to an inspection control component positioned before the security component in the receive path.

29. The method as recited in claim 25, wherein computer-executable instructions that when executed cause the computer system to activate message inspection comprise computer computer-executable instructions that when executed cause the computer system to activate message inspection in accordance instructions contained in a Simple Object Access Protocol (SOAP) envelope header.

30. A computer program product for use at a computer system connected to a network, the computer system including a component of a distributed application, the component of the distributed application at the computer system interoperating with components of the distributed application at other computer systems connected to the network through the exchange of distributed application messages to implement the functionality of the distributed application, the computer program product for implementing a method for securely inspecting a distributed application message, the computer program product comprising one or more computer storage media having stored thereon computer-executable instructions that, when executed by a processor, cause the computer system to perform the following:

receive a distributed application message from a first one of the other computer systems connected to the network, the distributed application message for delivery to the distributed application component at the computer system;

pass the received distributed application message to a message receive path at the computer system, the message receive path having one or more message path components including a message inspection component positioned prior to a security component in the message receive path and an inspection control component positioned after the security component in the message receive path, the message inspection component having previously been controlled by the inspection control component to integrate message inspection activation for any message sent to the distributed application component into the receive message path by loading one or more filters from a filter table in response to inspection instructions contained in a previously received message inspection control message, the message inspection control message received from a second one of the other computer systems connected to the network, the sender and contents of the previously received message inspection control message having been authenticated by the security component, authentication of the sender indicating an increased confidence that the message inspection is to be activated in accordance with instructions from an authorized entity, authentication of the contents of the message inspection control message indicating a decreased likelihood that the inspection instructions contained in the message inspection control message have been altered;

detect that the content of the received distributed application message from the first other computer system matches the filter criteria of at least one of the one or more loaded filters;

perform a corresponding inspection operation on the received distributed application message from the first other computer system in response to the detected match, the corresponding filter action performed in accordance with inspection instructions contained in the previously received and authenticated message inspection control message received from the second other computer system, the filter operation including extracting a portion of the received distributed application message for inclusion in an inspection report;

pass the accessed message through one or more message path components that are positioned in the message receive path subsequent to performing the corresponding filter action and prior to delivering the distributed application message to the distributed application component at the computer system.

31. The method as recited in claim 30, wherein computer-executable instructions that when executed cause the computer system to receive a message comprise computer-executable instructions that when executed cause the computer system to receive a Simple Object Access Protocol (SOAP) envelope.

32. The computer program product as recited in claim 30, further comprising:

computer-executable instructions that, when executed, cause the computer system to generate an inspection report for the received message, the inspection report including data related to the performed filter operation.

33. The method as recited in claim 32, wherein computer-executable instructions that when executed cause the computer system generate an inspection report for the received message comprise computer-executable instructions that when executed cause the computer system to generate an inspection report in accordance with instructions contained in a header of a Simple Object Access Protocol (SOAP) envelope.

* * * * *